(12) United States Patent
Ryan

(10) Patent No.: US 6,527,070 B2
(45) Date of Patent: Mar. 4, 2003

(54) BRAKE-ACTUATING STEERING AND BRAKING CONTROL SYSTEM FOR TRACKED VEHICLES

(75) Inventor: Robert G Ryan, El Dorado, AR (US)

(73) Assignee: PDSCO., Inc., El Dorado, AR (US)

(*) Notice: Subject to any disclaimer, the term of this patent is extended or adjusted under 35 U.S.C. 154(b) by 0 days.

(21) Appl. No.: 09/766,580

(22) Filed: Jan. 23, 2001

(65) Prior Publication Data

US 2002/0096374 A1 Jul. 25, 2002

(51) Int. Cl.⁷ ............................................. B62D 11/04
(52) U.S. Cl. ........................ 180/6.7; 180/6.2; 180/6.3
(58) Field of Search ..................... 180/6.7, 6.2, 6.24, 180/6.28, 6.3

(56) References Cited

U.S. PATENT DOCUMENTS 4,377,094 A * 3/1983 Thompson et al. .......... 180/6.7
4,702,358 A    10/1987 Mueller et al.
4,947,948 A * 8/1990 Duckinghaus .............. 180/6.7
5,948,029 A    9/1999 Straetker
6,039,132 A    3/2000 Easton

* cited by examiner

Primary Examiner—Matthew C. Graham
(74) Attorney, Agent, or Firm—Pillsbury Winthrop LLP

(57) ABSTRACT

A brake-actuating steering and braking control system for a tracked vehicle is provided with a braking control subsystem, a steering control subsystem, and right and left side brake-actuating subsystems. The braking control subsystem includes a brake pedal and is connected to brake mechanisms of each brake-actuating subsystem. A user may depress the brake pedal to apply a braking force to right and left side track assemblies of the tracked vehicle via the brake mechanisms to thereby slow or stop the tracked vehicle. The steering control subsystem includes a steering wheel and is connected to each of the brake mechanisms. The user may rotationally displace the steering wheel, which applies a braking force to the track assembly corresponding to the direction of rotational displacement of the steering wheel via the corresponding brake mechanism to thereby turn the tracked vehicle.

15 Claims, 7 Drawing Sheets

BRAKE-ACTUATING STEERING AND BRAKING CONTROL SYSTEM FOR TRACKED VEHICLES

FIELD OF THE INVENTION

The present invention relates to a steering system for a tracked vehicle and, more specifically, to a brake-actuating steering and braking control system.

BACKGROUND OF THE INVENTION

Turning a tracked vehicle is generally affected by controlling relative movement between two laterally spaced endless tracks of the vehicle. Basically, the track on a side of the vehicle corresponding to the direction of an intended turn is slowed relative to the track on the opposite side of the vehicle. As such, the vehicle performs a turn about the relatively slower track.

Previous steering systems for tracked vehicles have tended to be somewhat cumbersome, since the steering controls for these systems have been in the form of hand-controlled lever actuators. These types of control systems are generally awkward for the user, especially in complex maneuvering or for a beginner.

Differential steering systems have been developed to facilitate operation (steering) tracked vehicles, since these systems may be equipped with more user-friendly steering wheels. Differential steering systems vary the input to the tracks from respective drive motors and/or clutches to alter the magnitude of power delivered to each track relative to each other. To accomplish this, these systems generally require the use of a complex and expensive processor and feedback system to coordinate the relative operation of the different drive motors and/or clutches. Typical differential steering systems are described in U.S. Pat. No. 5,948,029 and 6,039,132.

An alternative to the differential steering system is described in U.S. Pat. No. 4,702,358. This system uses a processor and feedback system similar the differential steering systems described above to control relative clutching and braking of the separate drive assemblies for the tracks of the vehicle. Similar to the differential steering systems described above, however this system is complex and costly. Operation of this steering system (by the user) requires the manipulation of a tiller bar for steering control, which, as stated above, is awkward to operate.

Furthermore, tracked vehicles utilizing previous steering control systems for tracked vehicles have required separate (i.e., independent) braking systems, as the steering and braking systems were not cooperable with each other. In other words, processor controlled steering systems have required entirely separate braking systems (usually hydraulic systems), increasing the vehicle's cost and complexity.

SUMMARY OF THE INVENTION

The present invention avoids these limitations by providing a brake-actuating steering and braking control system for a tracked vehicle having right and left side track assemblies. The system includes a braking control subsystem, a steering control subsystem, and right and left side brake-actuating subsystems.

Each of the right and left side brake-actuating subsystems includes a respective one of right and left side brake mechanisms. Each of the right and left side brake mechanisms are coupled to a respective one of the right and left side track assemblies of the tracked vehicle and are constructed and arranged to brakingly engage respective right and left side track assemblies with a braking force proportional to an amount of fluid under pressure delivered thereto to thereby stop or at least slow respective track assemblies.

The braking control subsystem including a brake pedal is depressibly displaceable by a user. The braking control subsystem is communicated with each of the right and left side brake-actuating subsystems. Each of the right and left side brake mechanisms is actuated proportionally to a magnitude of displacement of the brake pedal by the user. Upon actuation, the right and left side track assemblies (and, as such the vehicle itself) are slowed (or stopped altogether) proportionally to the displacement magnitude of the brake pedal.

The steering control subsystem includes a steering wheel, which is rotatably displaceable by a user in clockwise and counter-clockwise directions. The steering control subsystem is communicated with each of the right and left side brake-actuating subsystems such that a corresponding one of the right and left side brake mechanisms is actuated proportionally to the magnitude of displacement of the steering wheel by the user. Upon actuation of the steering control subsystem, one of the track assemblies, according to the direction of displacement of the steering wheel, is stopped or at least slowed. Therefore, the tracked vehicle turns in a direction determined by the direction of displacement of the steering wheel within a radius determined by the magnitude of displacement of the steering wheel.

The steering and braking control system of the present invention provides user-friendly controls (steering wheel and brake pedal) and a simplified design, relative to previous systems. Furthermore, as the steering and braking control system affects steering and braking control of the tracked vehicle without using the processor and feedback systems of previous designs described above, the present invention is further simplified and provides a cost-effective alternative.

DETAILED DESCRIPTION OF THE INVENTION

Figure 1A:
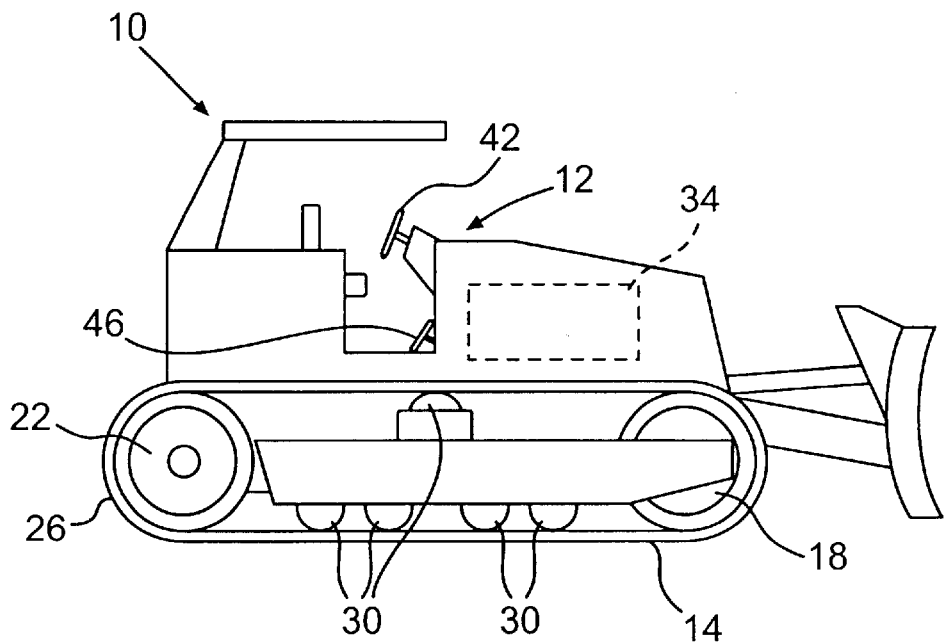
FIG. 1A is an elevational view of the right side of a tracked vehicle utilizing the brake-actuating steering and braking control system of the present invention.
Figure 1B:
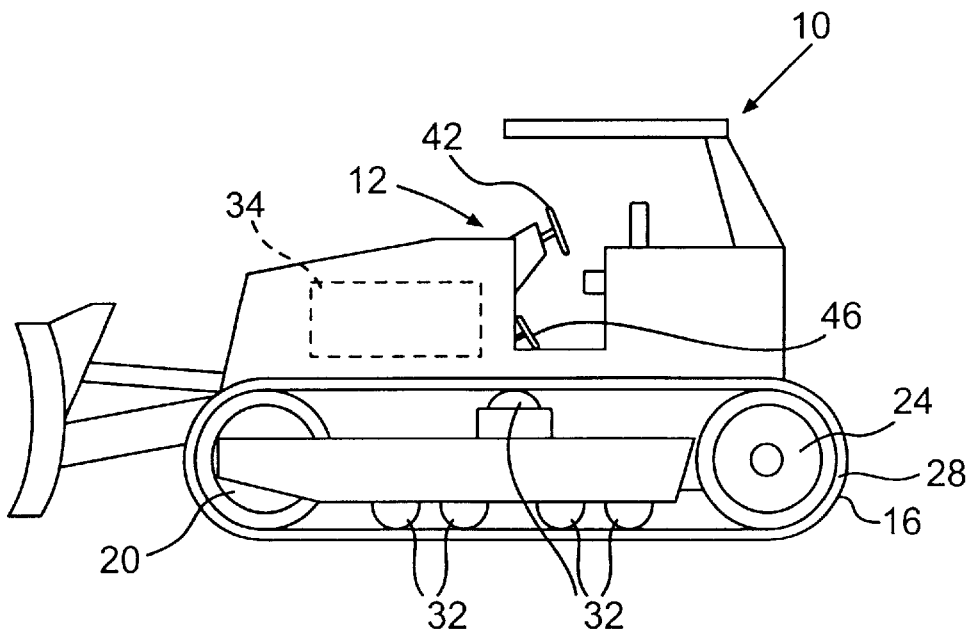
FIG. 1B is an elevational view of the left side of the vehicle shown in FIG. 1A.

FIGS. 1A and 1B show a tracked vehicle 10, exemplary of the type for use in conjunction with a brake-actuating steering and braking control system 12 of the present invention. The tracked vehicle 10 includes right and left side track assemblies 14, 16. Each of the right and left side track assemblies 14, 16 includes a driven hub 18, 20, and a free spinning hub 22, 24, which is freely rotatably mounted to the tracked vehicle 10. Right and left side endless track members 26, 28 are looped about respective driven hubs 18, 20 and free spinning hubs 22, 24. Right and left side rollers 30, 32 maintain tension in the track members and ground contact over the substantial underside length of the track members. It is noted that the tracked vehicle 10 illustrated in FIGS. 1A and 1B is shown as an example of a tracked vehicle that may utilize the steering and braking control system 12 of the present invention. It is further noted that tracked vehicle types that may also utilize the steering and control system 12 of the present invention may deviate in construction and componentry from the vehicle described and shown herein.

The driven hubs 18, 20 may be operatively connected to either a hydraulic motor or a mechanical transmission, with power derived from an internal combustion engine 34. In any case, the track assemblies 14, 16 are independently drivable (relative to each other) such that an operator may alter speeds and directions of the track assemblies 14, 16 independently from each other.

Figure 2:
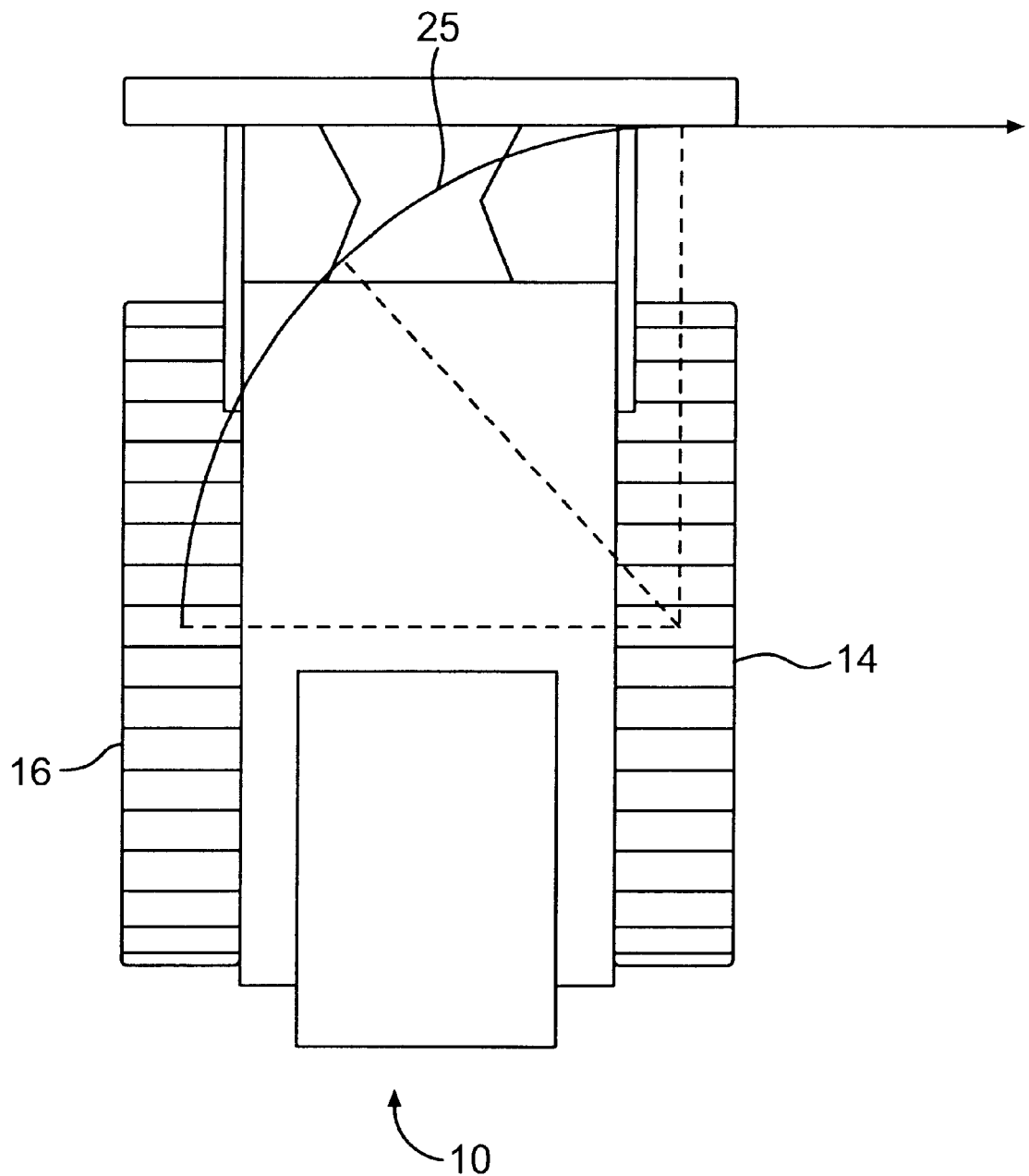
FIG. 2 is a top plan view of the tracked vehicle shown in FIGS. 1A and 1B illustrating the radius of a turn when one of the track assemblies is stopped.

Steering of the tracked vehicle 10 is accomplished by manipulating the speeds of the track assemblies 14, 16 relative to each other. For example, a 90° right turn, as shown by line 25 in FIG. 2, may be carried out by stopping movement of the right side track assembly 14, while maintaining movement of the left side drive assembly 16. As such, the movement of the left side track assembly 16 pivots the tracked vehicle 10 about the right side track assembly 14 within a radius defined by a lateral distance between the track assemblies 14, 16. It is noted that to turn the tracked vehicle 10 within a relatively larger radius, the right side track assembly 14, need not be altogether stopped, but merely slowed with respect to the movement of the left side track assembly 16.

Figure 3:
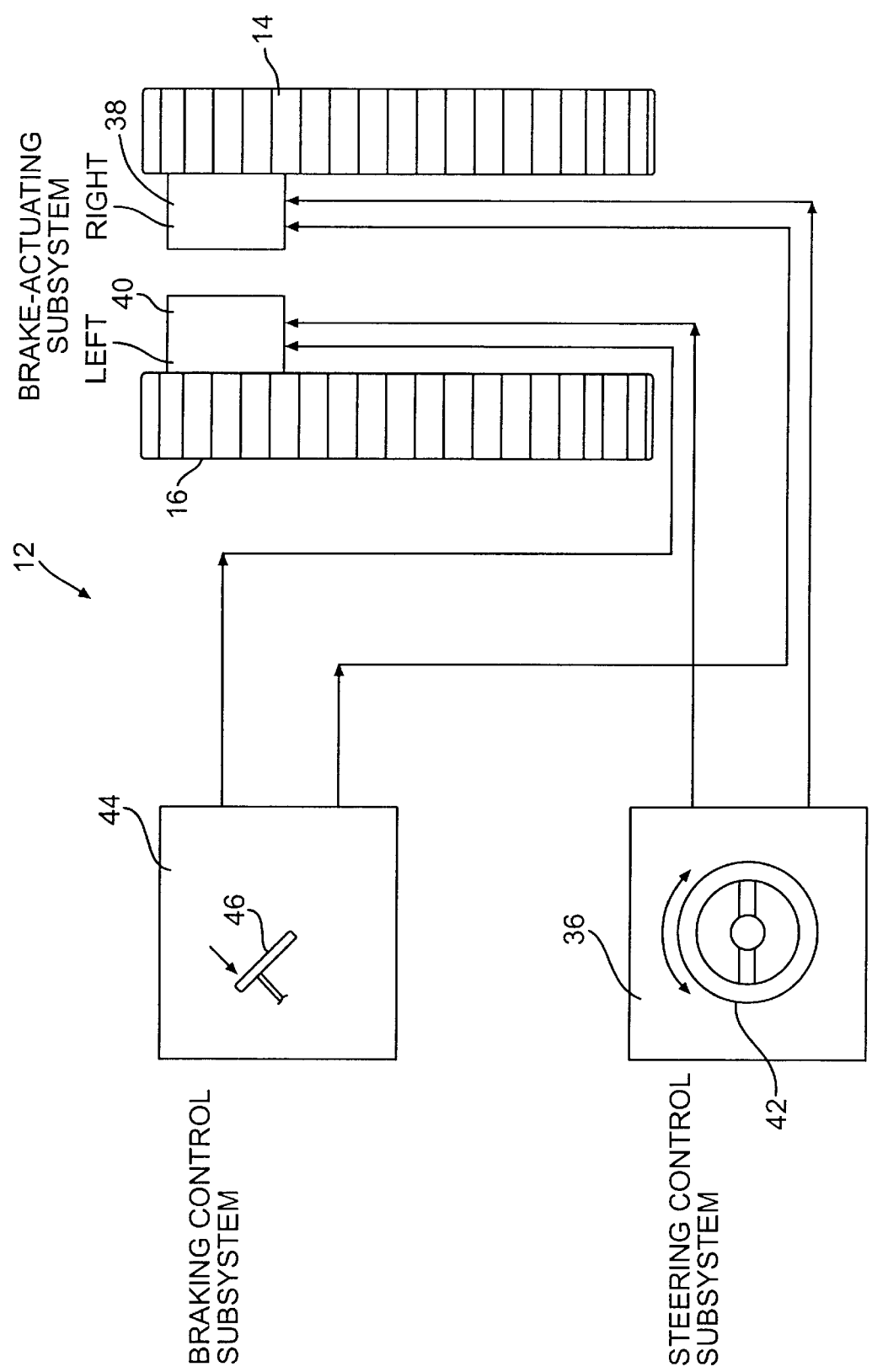
FIG. 3 is a general schematic view of the brake-actuating steering and braking control system of the present invention.

FIG. 3 shows a general schematic view of the brake-actuating steering and braking control system 12 of the present invention. A steering control subsystem 36 is operatively connected to each of a right and left side brake-actuating subsystems 38, 40. Each of the right and left side brake-actuating subsystems 38, 40 is coupled with the corresponding track assembly 14, 16 to be capable of exerting a braking force thereon. The steering control subsystem 36 is constructed and arranged, as will be further described hereinbelow, to independently control the magnitude of the braking force exerted on the track assemblies 14, 16 by the associated brake-actuating subsystem 38, 40 in order to steer the tracked vehicle 10, as described above. A steering wheel 42 (shown in FIGS. 1 and 3) rotatably mounted to the tracked vehicle 10 allows a user to manipulate the steering control subsystem 36 easily and thereby maneuver the tracked vehicle 10. Additionally, a braking control subsystem 44 is provided, which is also operatively connected to each of the brake-actuating subsystems 38, 40. The braking control subsystem 44, as will also be further described hereinbelow, is constructed and arranged to control the magnitude of braking force applied to the track assemblies 14, 16 by the brake-actuating subsystems 38, 40 in order to slow and/or stop the tracked vehicle 10. It is preferable that the braking control subsystem 44 and each of the brake-actuating subsystems 38, 40 cooperate to ensure that an equivalent braking force is applied to each track assembly 14, 16. The braking control subsystem 44 includes a brake pedal 46 (shown in FIGS. 1 and 3) to allow the user to manipulate the braking control subsystem 44 easily and to slow and/or stop the tracked vehicle 10.

Figure 4:
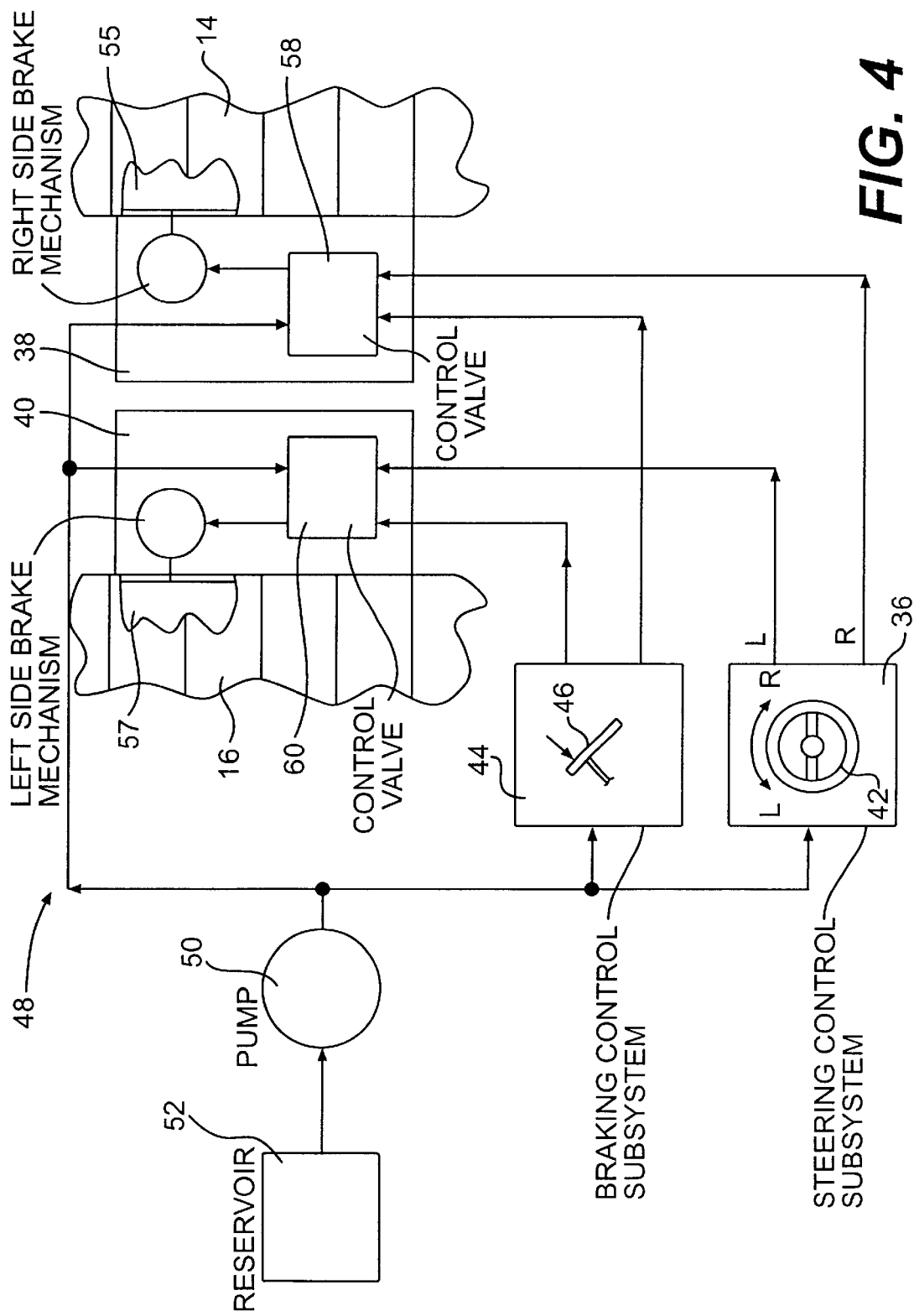
FIG. 4 is a schematic view of one embodiment of the system shown in FIG. 3.
Figure 5:
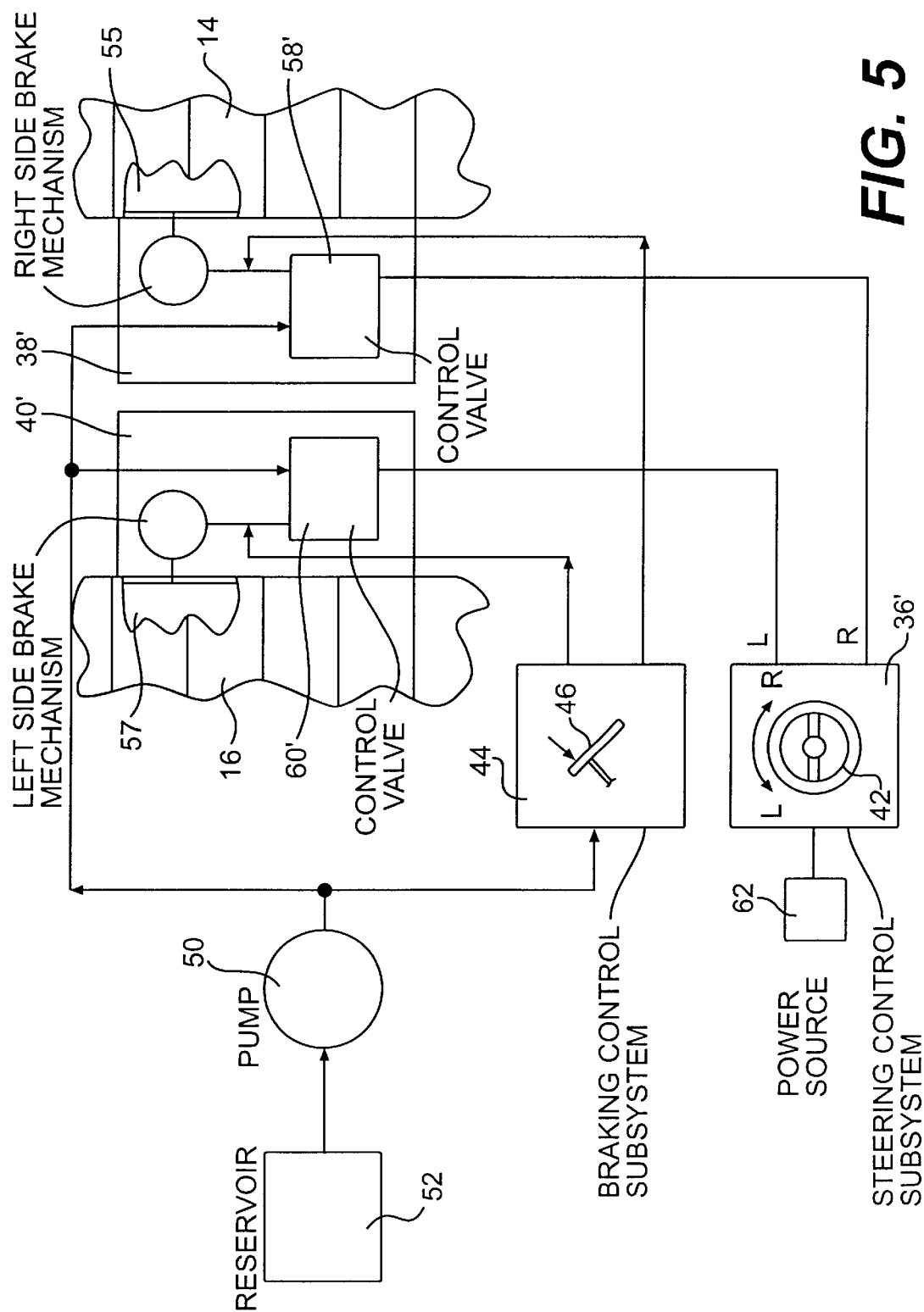
FIG. 5 is a schematic view of another embodiment of the system shown in FIG. 3.

There are two exemplary embodiments of the brake-actuating steering and braking control system of the present invention respectively described in FIGS. 4 and 5.

FIG. 4 schematically shows the embodiment of the steering and braking control system 48 of the present invention. This embodiment is in the form of a hydraulic circuit, which utilizes a hydraulic pump 50 to provide fluid under pressure to various components, as described hereinbelow. The components are interconnected with fluid pathways (denoted with arrows in FIG. 4) that may be external pathways, such as hoses, fittings, or pipes, or internal pathways, such as those through valves. The pump 50 is connected to a reservoir 52, which stores a supply of fluid. It may be preferable for the volume of the reservoir 52 to be sufficient to store an amount of fluid at least equal to the total volume of the system 48. As shown in FIG. 4, each of the brake-actuating subsystems 38, 40 includes a respective right and left side brake mechanism 54, 56. The right side brake mechanism 54 is connected to a braking hub 55 (may be either of the driven or free spinning hubs 18, 22) of the right side track assembly 14. Similarly, the left side brake mechanism 56 is connected to a braking hub 57 (may be either of the driven of free spinning hubs 20, 24) of the left side track assembly. It is noted that the braking hubs 55, 57 are representative of the respective hub (driven or free spinning) to which the respective brake mechanism is connected. In other words, each brake mechanism may be connected to either of the respective driven or free spinning hubs. Upon actuation, each brake mechanism 54, 56 is constructed and arranged to be capable of exerting a braking force on the respective hub 55, 57 thereof. The braking force applied to the hubs 55, 57 by each of the brake mechanisms 54, 56 is proportional to the pressure of the fluid supplied thereto.

As further shown in FIG. 4, the brake-actuating subsystems 38, 40 include one of a pair of hydraulically-actuated pressure control valves 58, 60. The steering control subsystem 36 and the braking control subsystem 44 are both operatively connected to each of the pressure control valves 58, 60 so as to be capable of delivering fluid under pressure thereto. The pressure control valves 58, 60 are constructed and arranged to deliver an amount of fluid under pressure to the brake mechanisms 54, 56 proportional to the pressure of the fluid supplied thereto from the braking control subsystem 44 and the steering control subsystem 36.

The steering wheel 42 is rotatably movable in clockwise (denoted by R in FIG. 4) and counter-clockwise (denoted by L in FIG. 4) directions by the user. The steering control system 36 governs the amount of fluid under pressure supplied to each of the pressure control valves 58, 60 based on movements of the wheel 42. For example, for movement of the steering wheel 42 in the clockwise direction (such ,as that for a right turn), the pressure control valve 58 is supplied an amount of pressurized fluid proportional to the rotational displacement of the steering wheel 42 Consequently, the pressure control valve 58 allows fluid under pressure from the pump 50 to flow through the valve 58 and to actuate the brake mechanism 54, thus braking the right side track assembly 14 with a braking force proportional to the rotational displacement of the steering wheel 42. As such, the tracked vehicle 10 turns to the right. It is noted that large rotational displacements of the steering wheel 42 (such as when turning sharply) produce a greater braking force applied to the corresponding brake mechanisms 54, 56 effectively decreasing the radius of the turn. As such, the tracked vehicle 10 turns in proportion to the steering wheel displacement, similarly as with conventional automobiles. This feature of the present invention is highly advantageous over complex lever-controlled prior systems.

The braking control subsystem 44 is similar to the steering control subsystem 36 in that the braking force applied to the track assemblies 14, 16 is proportional to the displacement of the brake pedal 46. However, the braking control subsystem 44 cooperates with the brake-actuating subsystems 38, 40 to apply a substantially equal braking force to each track assembly 14, 16 to therefore slow or stop the tracked vehicle 10.

FIG. 5 shows another embodiment 48' of the brake-actuating steering and braking control system 12. As shown, the steering control system 36' of this embodiment is electrical in nature and is supplied with an electric current from a power source 62. It may be preferable for the power source 62 to be an alternator coupled to the internal combustion engine 34 (FIGS. 1A and 1B), or a separate power source, such as a battery or a generator. It is noted that the generator may be coupled to the engine 34. The power source 62 is electrically connected to a steering control subsystem 36', which is manipulated via the steering wheel 42 by the user. The steering control subsystem 36' is constructed and arranged to vary voltages of electrical outputs (indicated at R and L in FIG. 5) delivered to each of a pair of electrically-actuated pressure control valves 58', 60' proportionally to the rotational displacement of the steering wheel 42 in one of the clockwise and counter-clockwise directions. The pressure control valves 58', 60' govern the amount of fluid under pressure delivered to the brake mechanisms 54, 56, respectively in proportional response to the voltage of the electrical power delivered thereto from the steering control subsystem 36'. Consequently, similarly as with the embodiment of the brake-actuating steering and braking control system 48 described above with regard to FIG. 4, the radius of the turn performed by the tracked vehicle 10 is based on the magnitude of rotational displacement of the steering wheel 52.

Figure 6:
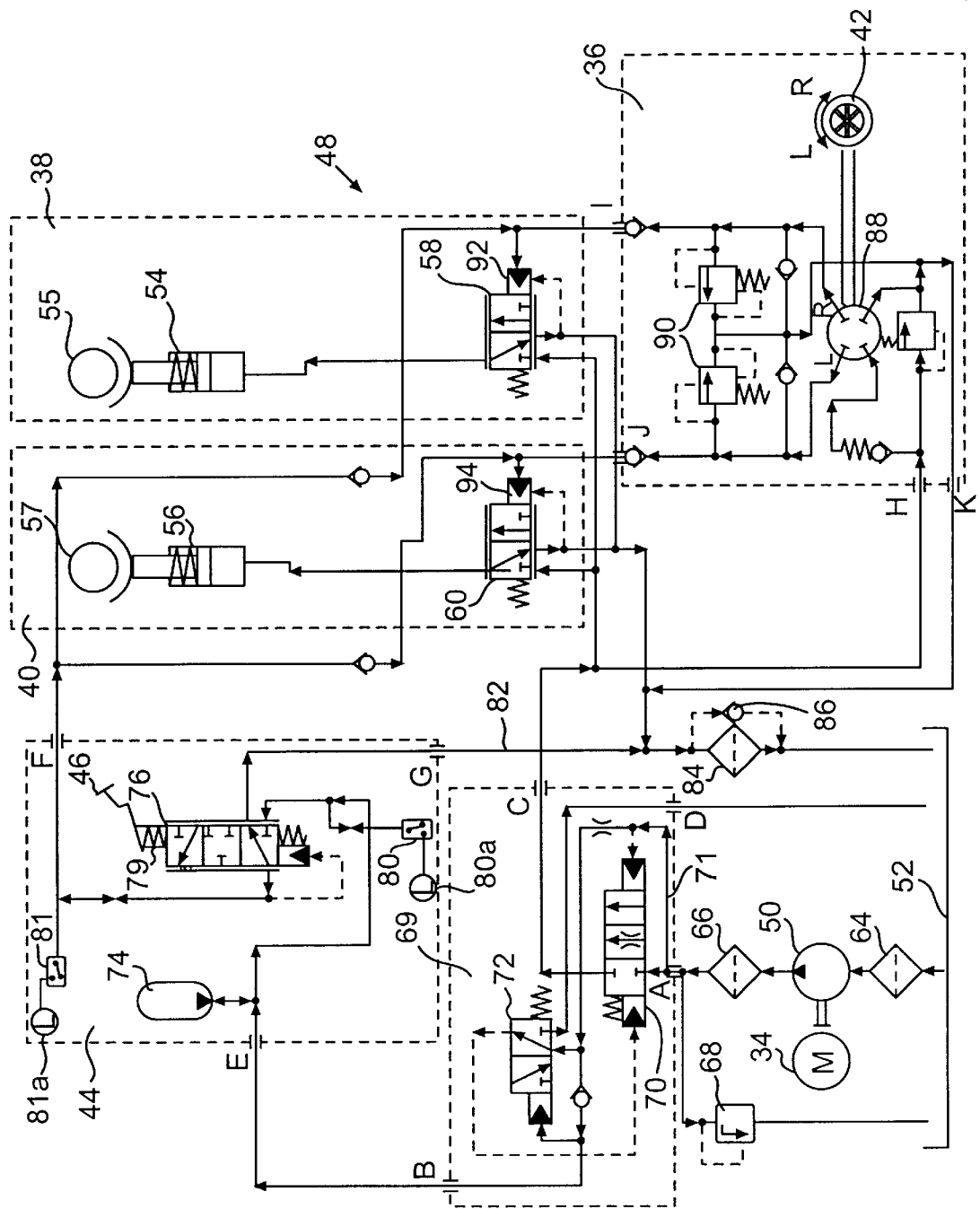
FIG. 6 is a circuit diagram illustrating a possible hydraulic circuit embodying the principles of the system shown in FIG. 4.

The embodiment of the brake-actuating steering and braking control system 48, shown in FIG. 4 is further shown, in more detail, in FIG. 6. It is noted that both FIGS. 6 and 7 include standard ISO fluid power graphic symbols representing the specific components within each embodiment. The pump 50 is coupled to the electric motor or the internal combustion engine 34 to pull hydraulic fluid from the reservoir 52 into an inlet of the pump 50 via a filter 64. An outlet of the pump 50 is connected to an inlet of an additional filter 66. An outlet of the filter 66 is connected to both a pressure relief valve 68 and an inlet, indicated at A, of an accumulator control valve 69. The pressure relief valve 68 serves to protect the componentry of the brake-actuating steering and braking control system 48 by allowing the hydraulic fluid to pass therethrough and into the reservoir 36 when a predetermined (and user-variable) relatively high pressure is reached. Therefore, valve 68 is also used to set system pressure. The inlet A provides a pathway that is connected to an inlet of a first valve 70, which is a three position, 2 way valve, and an inlet of a second valve 72, which is a 2 position, 3 way valve. A first outlet B of the accumulator control valve 69 is connected through an inlet E to an accumulator 74 of the braking control system 44. A second outlet C of the valve 69 is connected to the pressure control valves 58, 60 and the steering control subsystem 36. A third outlet D is connected to the reservoir 52 to provide a drain for the accumulator control valve 69. It is noted, that the accumulator control valve 69 may have other construction different than described herein with any componentry to allow the control valve 69 to govern fluid dispersal between the braking control system 44 and the steering control system 36 (and the pressure control valves 58, 60), as described above.

The accumulator 74 is constructed and arranged to store a volume of fluid under pressure that is deliverable to components of the steering and braking control system 48 without the need of an additional fluid source (e.g., the pump 50). The braking control system 44 further includes a braking control actuator 76 connected to the accumulator 74. The braking control actuator 76 is illustrated as a three position, 3 way valve with an input from the accumulator 74 and operatively coupled to the brake pedal 46 (shown in FIGS. 1A and 1B), so as to be actuable by the user. The brake pedal 46 is coupled to a mechanical actuator 79 of the valve 76. As shown, the valve 76 is selective through three primary positions, as well as an infinite number of intermediate positions therebetween. The brake pedal 46 (via the mechanical actuator 79) changes the position of the valve 76 corresponding to the displacement of the brake pedal 46. The positions of the valve 76 range infinitely incrementally from an initial position (as shown), wherein fluid supplied thereto from the accumulator (or pump 50) is prevented from passing therethrough, to a fully actuated position, wherein fluid delivered thereto passes therethrough and is supplied to the control valves 58, 60 (through the output F). Similarly to the valve 76, the pressure control valves 58, 60 are infinitely variable with the positions thereof selective via the hydraulic actuators 92, 94. As shown, the output of the braking control subsystem 44 is connected to each of the pressure control valves 58, 60 in order to deliver an amount of fluid thereto (corresponding to the displacement of the pedal 46, as described above). In turn, the actuators 92, 94 change positions of the respective valves 58, 60 corresponding to the amount of fluid delivered thereto. As such, the positions of the pressure control valves 58, 60 are selective by displacement of the brake pedal 46.

The braking control system 44 additionally includes a switch 80 that is operatively connected to a warning light 80a situated within viewing range of the user. The switch 80 is constructed and arranged to illuminate the warning light 80a when the pressure supplied by the accumulator 74 is reduced below a predetermined relatively low pressure. A switch 81 is operatively connected to at least one brake light 81a of the tracked vehicle 10, such that the brake light 81a is illuminated upon actuation of the braking control actuator 76 by the user (via the brake pedal 46). The braking control actuator 76 is also connected to the drain 82 that provides a pathway for fluid flow from the actuator 76, through an outlet G, to the reservoir 52. The drain 82 preferably includes a filter 84 and a check valve 86 to allow fluid to bypass the filter 84 when flow is restricted therethrough, such as by particle accumulation therein.

The steering control system 36 has an inlet, indicated at H, which is connected to the outlet C of the accumulator control valve 69. The steering control system 36 includes a steering wheel-activated steering control valve 88, which is coupled to the steering wheel 42. The steering control valve 88 includes a pair of outlet ports, indicated at R and L, which are connected to the pressure control valves 58 and 60, respectively, through the outlets I and J of the steering control system 36. The steering control valve 88 is additionally connected through an outlet K to the drain 82 to allow fluid to pass therethrough and into the reservoir 52. The steering control system 36 further includes a pair of relief valves 90 to allow fluid flowing to the pressure control valves 58, 60 from the steering control valve 88 to bypass therethrough and flow to the drain 82 upon reaching a predetermined relatively high pressure.

The pressure control valves 58, 60 are preferably of the type that are capable of being hydraulically actuated. As shown in FIG. 6, the respective outlets I, J and F, G of the steering control system 36 and the braking control system 44 are connected to hydraulic actuators 92, 94 of the pressure control valves 58, 60. The pressure control valves 58, 60 are connected to respective brake mechanisms 54, 56 and to the drain 82. As shown, the pressure control valves are two position, three way valves that define two primary positions and an infinite number intermediate positions. Positions of the valve range infinitely incrementally from a neutral position, wherein the fluid supply from the accumulator control valve 69 is closed and respective brake mechanisms 54, 56 are connected to the drain 82 (preventing pressure build-up therein and actuation thereof) to a fully actuated position, wherein the fluid supply is delivered to the respective brake mechanisms 54, 56. The intermediate positions of the valves 58, 60 are infinitely variable between the open and closed positions corresponding to input from the hydraulic actuators 92, 94. In turn, the hydraulic actuators 92, 94 are each connected to the steering and braking control subsystems 36, 44. As such, the pressure control valves 58, 60 are moveable between its positions by either (or both simultaneous) of the steering and braking control subsystems 36, 44.

As shown in FIG. 6, there are various fluid pathways that interconnect the various components of the brake-actuating steering and braking control system 48. It is noted that these pathways may be in the form of rigid or flexible hosing or piping; however they may also be integral pathways formed within specific valves and components, as is well known in the art. The same is true, of course, in FIG. 7, also.

Figure 7:
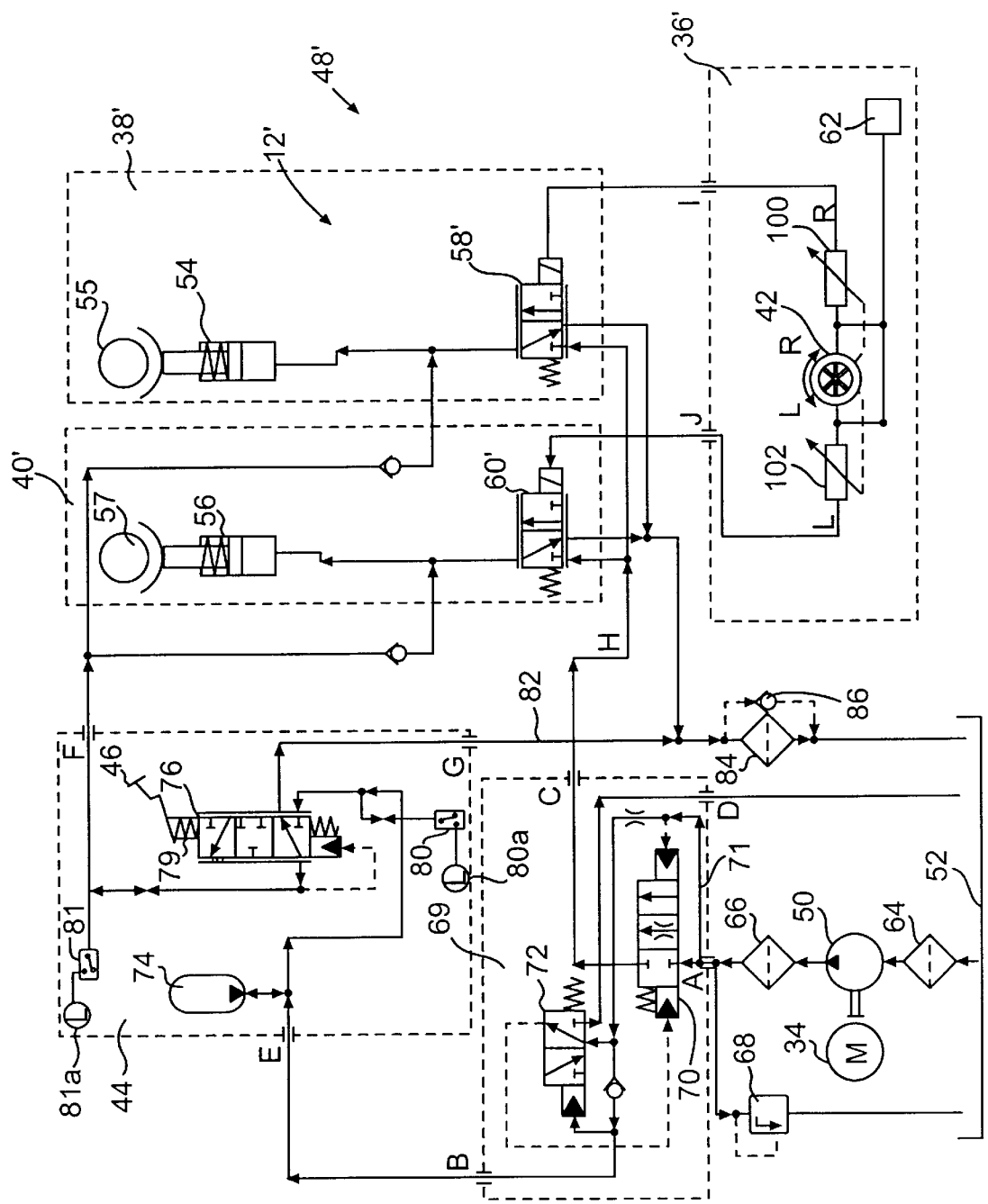
FIG. 7 is a circuit diagram illustrating a possible hydraulic circuit embodying the principles of the system shown in FIG. 5.

The embodiment of the brake-actuating steering and braking control system 48', shown in FIG. 5, is detailed in FIG. 7 where it utilizes a pair of electrically-actuated pressure control valves 58', 60' that include respective electrically manipulable solenoid actuators 92', 94'. The solenoid actuators 92', 94' are, in turn, connected to the steering control subsystems 36'. The steering wheel 42 is operatively coupled to the steering control subsystem 36' such that rotational movement of the steering wheel 42 in either of the clockwise or counter-clockwise directions alters the voltage output of a pair of voltage varying structures 100, 102. Each voltage varying structure 100, 102 may include a constant resistance resistor and a variable resistance potentiometer, wherein the potentiometer is coupled to the steering wheel 42, such that movement of the steering wheel 42 causes respective changes in resistance of the potentiometer. It is contemplated that other constructions of the voltage varying structures 100, 102 are also possible. Electrical power is supplied to the steering control subsystem 36' by the power source 62, which is preferably a primary electrical system of the tracked vehicle 10. It is contemplated that the power source 62 may also be in the form of a separate battery and/or a separate alternator or generator. In any case, electrical power flows from the power source 62 through the voltage varying structures 100, 102 and to the electrically-actuated pressure control valves 58', 60'. As the steering wheel 42 is rotationally displaced by the user, the resistance of one of the voltage varying structures 100, 102 (corresponding to the direction of displacement) is increased, thus decreasing the voltage that reaches the respective pressure control valve 58', 60'.

The pressure control valves 58', 60' are similar to the valves 58, 60 except for the solenoid actuators 92', 94' in lieu of the hydraulic actuators 92, 94. As shown in FIG. 7, the outlets I, J and F of the steering control system 36' and the braking control system 44 are connected to brake mechanisms 54, 56, respectively. As such, the braking mechanisms 54, 56 may be actuated by either of the steering control system 36' and the braking control system 44, or both simultaneously.

OPERATION

Operation of the embodiment of the system 48 shown in FIGS. 4 and 6 is described hereinbelow. Positions of the valves shown in FIG. 6 correspond to neutral positions or initial positions thereof. Upon initialization of the system (i.e., start up of the pump 50), fluid from the pump 50 is supplied to the valve 70, which, as shown, is initially closed. The fluid flows through the accumulator control valve 69 via line 71 until a predetermined relatively high pressure is reached within the accumulator 74 and the pathway between valve 72 and the accumulator 74. When this predetermined pressure is reached, the valve 72 is actuated (moved from the initial position) affecting the actuation (opening) of valve 70 (i.e., movement of the valve from the neutral, or closed, position toward the open position). Fluid then flows through the valve 70 through the outlet C to the pressure control valves 58, 60 and to the steering control subsystem 36. As shown, the pressure control valves 58, 60 are initially closed. As such, the fluid from the accumulator control valve 69 is directed to the steering control subsystem 36 through the inlet H to the steering control valve 88. The steering control valve 88 has an initial position which allows the fluid to flow therethrough and into the drain 82, so as to limit the pressure build-up in the system 48 and prevent unwanted actuation of the pressure control valves 58,60.

As stated previously, actuation of the valve 76 is affected by depression of the brake pedal 46. The mechanical actuator 79 then moves the valve from the neutral (initial) position toward the open position according to the magnitude of displacement of the brake pedal 46. As the valve 76 of the variable type, it has an infinite number of intermediate positions between the closed position (center position of the valve 76) and the fully open position. The position of the valve (e.g., the amount of fluid allowed to flow through it) is altered in relation to the position of the brake pedal 46 (via the mechanical actuator 79). Upon depressing the brake pedal 46, the valve 76 is actuated (moved toward the open position) and allows fluid under pressure from the accumulator 74 to flow therethrough to the pressure control valves 58, 60. The amount of fluid released from the valve 76 is proportional to the displacement of the brake pedal 46.

The amount of fluid released from the pressure control valves 58, 60 is related to the amount of fluid discharged from the valve 76. As stated previously, the pressure control valves 58, 60 are of the variable type, which defines two primary positions with an infinite number of intermediate positions therebetween. For each valve 58, 60, the respective hydraulic actuator 92, 94 effectively changes the position of the valve through the intermediate position, between the open and closed positions. The outputs from the braking and steering control subsystems 44, 36 are connected to the hydraulic actuators 92, 94 and deliver amounts of fluid thereto corresponding to displacements of the brake pedal 46 and steering wheel 42, respectively. The hydraulic actuators 92, 94 are displaced according to the amount of fluid delivered thereto and thereby effectively move the valves 58, 60 to corresponding positions.

In turn, the pressure control valves 58, 60 allow an amount of fluid (from the accumulator control valve 69) to pass therethrough corresponding to the position the valve is in, thereby controlling the amount of fluid delivered to the brake mechanisms 54, 56 (and therefore, the brake force produced by each). Thus, the braking force applied to each hub 55, 57 is determined by the user-actuable brake pedal 46 and/or steering wheel 42. Preferably, the actuation of the pressure control valves 58, 60 by the brake control subsystem 44, is substantially equal for both valves 58, 60 so that each brake mechanism 54, 56 is substantially equally applied, when actuated by the braking control subsystem 44 alone.

When the pressure within the accumulator 74 reaches a predetermined relatively lower pressure (due to fluid exiting the brake control subsystem 44), valve 72 returns to the initial position, thereby redirecting fluid to the accumulator 74 until the pressure therein returns to the predetermined relatively high pressure. It may be preferable for the threshold value at which the valve 72 returns to the initial position (thereby allowing the pressure within the accumulator 74 to increase) to be relatively close to the predetermined high pressure. In other words, it may be preferable for the accumulator 74 to maintain a relatively high pressure therein.

Upon movement of the steering wheel 42 by the user, the steering control valve 88 is actuated so as to allow an amount of fluid from the accumulator control valve 69 (outlet C) to flow to the steering control valve 88 and to exit an outlet port (R or L, shown in FIG. 6), which actuates one of the pressure control valves 58, 60. As shown in FIG. 6, the steering control valve 88 is a four way variable type valve that has an infinite number of intermediate positions and is manually actuable via the steering wheel 42. The steering control valve 88 is supplied with fluid from the accumulator control valve 69 and in a neutral (initial, or non-displaced) position allows the fluid supplied thereto to pass therethrough and enter the drain 82. However, when the steering wheel 42 is displaced in either direction (clockwise or counter-clockwise), the valve 88 moves in relation to the steering wheel 42 so as to allow a corresponding amount of fluid (dependent on the magnitude of displacement) from the accumulator control valve 69 to pass therethrough and exit one of a pair of exit ports R, L (corresponding to the direction of displacement). Each of the exit ports R, L of the steering control valve 88 is connected to a respective hydraulic actuator 92, 94. As described above, the hydraulic actuators 92, 94 are displaceable relative to the amount of fluid delivered thereto, thereby moving the valves 58, 60 into positions corresponding to the amount of fluid delivered to the actuators 92, 94. Fluid exiting one of the exiting ports R, L acts on one of the hydraulic actuators 92, 94, thereby moving the respective valve 58, 60 into a position corresponding to the amount of fluid delivered to the actuator 92, 94. As such, the associated valve 58, 60 allows a corresponding amount of fluid (from the accumulator control valve 69) to pass therethrough and actuate the corresponding brake mechanism 54, 56. Accordingly, the brake mechanism corresponding to the direction of displacement of the steering wheel 42 is actuated to apply a braking force to the corresponding track proportional to the magnitude of displacement of the steering wheel. As such, the tracked vehicle 10 performs a turn with a radius corresponding to the displacement of the steering wheel 42, as described above. The operation is similar for right or left turns of the tracked vehicle 10.

It is noted that both the steering control system 36 and the braking control system 44 may be actuated simultaneously by the user, such as when performing a turn and slowing at the same time. For this type of maneuver, both brake mechanisms 54, 56 are applied corresponding to the displacement of the brake pedal 46 (as described above), while the brake mechanism corresponding to the direction of the turn (brake mechanism 54 for a right turn and brake mechanism 56 for a left turn) is additionally applied corresponding to the displacement of the steering wheel 42.

Operation of the embodiment of the system 48', shown in FIGS. 5 and 7 is similar for the embodiment of the system 48 described above. Fluid under pressure is supplied to the braking control subsystem 44 by the accumulator 74. The pressure control valves 58', 60' are supplied fluid under pressure by the accumulator control valve 69. As previously described, the brake pedal 46 is coupled to the brake control valve 76 via the mechanical actuator 79. Displacement of the pedal 46 invokes a corresponding displacement of the valve 76. When moved toward the open position (due to depression of the brake pedal 46), the valve 76 allows an amount of fluid to pass therethrough corresponding to the displacement of the valve 76. In turn, the braking control subsystem 44 is connected through outlet F to each of the brake mechanisms 54, 56. Each brake mechanism 54, 56 is actuated corresponding to the amount of fluid delivered thereto from the braking control subsystem 44, thereby producing a braking force corresponding to the displacement of the brake pedal 46. The braking control actuator 76 is connected to each of the brake mechanisms 54, 56 such that, when the brake pedal 46 is displaced by the user, a substantially equal volume of fluid under pressure is delivered to each of the brake mechanisms 54, 56 in proportion to the displacement of the brake pedal 46.

Upon rotational displacement of the steering wheel 42 in, for example, the clockwise direction, the resistance of the voltage varying structure 100 is preferably decreased, thereby delivering electrical power of a greater voltage to the voltage-actuated pressure control valve 58'. The valve 58' is then actuated allowing fluid under pressure from the accumulator control valve 69 to pass therethrough and apply brake mechanism 54. As such, the right side track assembly 14 is braked proportionally to the displacement of the steering wheel 42 and the tracked vehicle 10 performs a right turn with a radius corresponding to the displacement of the steering wheel 42. Similarly, when the steering wheel 42 is displaced in the counterclockwise direction, the resistance in the voltage varying structure 102 is decreased, thereby delivering a greater voltage to the pressure control valve 60'. As such, the tracked vehicle 10 performs a left turn with a radius proportional to the displacement of the steering wheel 42. The braking control system 44 and the steering control system 36' may be actuated simultaneously to slow and turn the tracked vehicle 10 at the same time.

It will be appreciated that numerous modifications to and departures from the embodiments of the invention described above will occur to those having skill in the art. Such further embodiments are deemed to be within the scope of the following claims.

What is claimed is:

1. A brake-actuating steering and braking control system for a tracked vehicle having right and left side track assemblies, said system comprising:

a braking control subsystem;

a steering control subsystem;

right and left side brake-actuating subsystems;

each of said right and left side brake-actuating subsystems including a respective one of right and left side brake mechanisms, each of said right and left side brake mechanisms being coupled to a respective one of said right and left side track assemblies of said tracked vehicle and being constructed and arranged upon actuation to brakingly engage respective right and left side track assemblies;

said braking control subsystem including a brake pedal depressibly displaceable by a user, said braking control subsystem being communicated with each of said right and left side brake-actuating subsystems such that each of said right and left side brake mechanisms is actuated proportionally to a magnitude of displacement of said brake pedal by said user such that upon actuation, the right and left side track assemblies are one of slowed and stopped according to the displacement magnitude of the brake pedal, thereby slowing or stopping the tracked vehicle according to the magnitude of displacement of said brake pedal;

said steering control subsystem including a steering wheel rotatably displaceable by a user in clockwise and counter-clockwise directions, said steering control subsystem being communicated with each of said right and left side brake-actuating subsystems such that a corresponding one of said right and left side brake mechanisms is actuated proportionally to a magnitude of displacement of said steering wheel by said user such that upon actuation, one of the track assemblies according to the direction of displacement of said steering wheel, is one of slowed and stopped, thereby turning the tracked vehicle in a direction determined by the direction of displacement of said steering wheel within a radius determined by the magnitude of displacement of said steering wheel, a fluid reservoir for storing a volume of fluid;

a hydraulic pump connected to said reservoir for removing fluid therefrom; and an accumulator control valve, which is connected to and supplied pressurized fluid from said hydraulic pump, said accumulator control valve being constructed and arranged to deliver fluid under pressure to one of said braking control subsystem and said right and left side brake-actuating subsystems, wherein said braking control subsystem includes a fluid accumulator, said fluid accumulator being constructed and arranged to store a volume of fluid under pressure therein.

2. A system according to claim 1, wherein said steering control subsystem includes a voltage varying structure coupled to said steering wheel from controlling said right and left side brake-actuating systems according to the rotational displacement of said steering wheel.

3. A system according to claim 1, wherein said steering control subsystem hydraulically controls said right and left side brake actuating systems according to the rotational displacement of said steering wheel.

4. A system according to claim 1, wherein said braking control subsystem includes a voltage varying structure, which is coupled to said brake pedal, said voltage varying structure being capable of delivering electrical power having a voltage corresponding to the displacement magnitude of said brake pedal to each of said right and left side brake-actuating subsystems.

5. A system according to claim 1, wherein said accumulator control valve includes a three-way valve and a two-way valve.

6. A system according to claim 1, wherein said braking control subsystem includes a brake light switch constructed and arranged to illuminate a brake light of the tracked vehicle upon depression of said brake pedal.

7. A system according to claim 6, wherein said braking control subsystem further includes a warning light switch constructed and arranged to illuminate a warning light of the tracked vehicle once fluid within the braking control subsystem reaches a predetermined relatively low pressure.

8. A brake-actuating steering and braking control system for a tracked vehicle having right and left side track assemblies, said system comprising:

a braking control subsystem;

a steering control subsystem;

right and left side brake-actuating subsystems;

each of said right and left side brake-actuating subsystems including a respective one of right and left side brake mechanisms, each of said right and left side brake mechanisms being coupled to a respective one of said right and left side track assemblies of said tracked vehicle and being constructed and arranged upon actuation to brakingly engage respective right and left side track assemblies;

said braking control subsystem including a brake pedal depressibly displaceable by a user, said braking control subsystem being communicated with each of said right and left side brake-actuating subsystems such that each of said right and left side brake mechanisms is actuated proportionally to a magnitude of displacement of said brake pedal by said user such that upon actuation, the right and left side track assemblies are one of slowed and stopped according to the displacement magnitude of the brake pedal, thereby slowing or stopping the tracked vehicle according to the magnitude of displacement of said brake pedal;

said steering control subsystem including a steering wheel rotatably displaceable by a user in clockwise and counter-clockwise directions, said steering control subsystem being communicated with each of said right and left side brake-actuating subsystems such that a corresponding one of said right and left side brake mechanisms is actuated proportionally to a magnitude of displacement of said steering wheel by said user such that upon actuation, one of the track assemblies according to the direction of displacement of said steering wheel, is one of slowed and stopped, thereby turning the tracked vehicle in a direction determined by the direction of displacement of said steering wheel within a radius determined by the magnitude of displacement of said steering wheel, wherein said braking control subsystem includes a voltage varying structure, which is coupled to said brake pedal, said voltage varying structure being capable of delivering electrical power having a voltage corresponding to the displacement magnitude of said brake pedal to each of said right and left side brake-actuating subsystems, and wherein each of said right and left side brake-actuating subsystems includes a pressure control valve, said pressure control valves having a voltage actuator, which are connected to said voltage varying structure such that each of said pressure control valves are actuated proportionally to the voltage of the electrical power delivered thereto from the voltage varying structure thereby actuating each of said brake-actuating mechanisms proportionally to the magnitude of displacement of said brake pedal.

9. A brake-actuating steering.and braking control system for a tracked vehicle having right and left side track assemblies, said system comprising:

a braking control subsystem;

a steering control subsystem;

right and left side brake-actuating subsystems;

each of said right and left side brake-actuating subsystems including a respective one of right and left side brake mechanisms, each of said right and left side brake mechanisms being coupled to a respective one of said right and left side track assemblies of said tracked vehicle and being constructed and arranged upon actuation to brakingly engage respective right and left side track assemblies;

said braking control subsystem including a brake pedal depressibly displaceable by a user, said braking control subsystem being communicated with each of said right and left side brake-actuating subsystems such that each of said right and left side brake mechanisms is actuated proportionally to a magnitude of displacement of said brake pedal by said user such that upon actuation, the right and left side track assemblies are one of slowed and stopped according to the displacement magnitude of the brake pedal, thereby slowing or stopping the tracked vehicle according to the magnitude of displacement of said brake pedal;

said steering control subsystem including a steering wheel rotatably displaceable by a user in clockwise and counter-clockwise directions, said steering control subsystem being communicated with each of said right and left side brake-actuating subsystems such that a corresponding one of said right and left side brake mechanisms is actuated proportionally to a magnitude of displacement of said steering wheel by said user such that upon actuation, one of the track assemblies according to the direction of displacement of said steering wheel, is one of slowed and stopped, thereby turning the tracked vehicle in a direction determined by the direction of displacement of said steering wheel within a radius determined by the magnitude of displacement of said steering wheel, a fluid reservoir for storing a volume of fluid;

a hydraulic pump connected to said reservoir for removing fluid therefrom; and an accumulator control valve, which is connected to and supplied pressurized fluid from said hydraulic pump, said accumulator control valve being constructed and arranged to deliver fluid under pressure to one of said braking control subsystem and said right and left side brake-actuating subsystems, wherein said braking control subsystem includes a fluid accumulator, said fluid accumulator being constructed and arranged to store a volume of fluid under pressure therein, wherein each of said right and left side brake-actuating subsystems includes a pressure control valve, each pressure control valve being communicated with said accumulator control valve and having fluid under pressure supplied therefrom, each of said pressure control valves having a hydraulic actuator, which is constructed and arranged to actuate associated pressure control valves in proportion to an amount of fluid under pressure supplied thereto.

10. A system according to claim 9, wherein said steering control subsystem includes a steering control valve, which is connected to and supplied pressurized fluid from said accumulator control valve, said steering control valve being connected to said steering wheel and being capable of delivering an amount of fluid under pressure to an associated one of said hydraulic actuators corresponding to the direction of displacement of said steering wheel, said amount corresponding to the magnitude of displacement of said steering wheel.

11. A system according to claim 10, wherein said brake control subsystem is connected to each of said hydraulic actuators and being capable of delivering an amount of fluid under pressure to each of said hydraulic actuators, said amount corresponding to the magnitude of displacement of said brake pedal.

12. A brake-actuating steering and braking control system for a tracked vehicle having right and left side track assemblies, said system comprising:

a braking control subsystem;

a steering control subsystem;

right and left side brake-actuating subsystems;

each of said right and left side brake-actuating subsystems including a respective one of right and left side brake mechanisms, each of said right and left side brake mechanisms being coupled to a respective one of said right and left side track assemblies of said tracked vehicle and being constructed and arranged upon actuation to brakingly engage respective right and left side track assemblies;

said braking control subsystem including a brake pedal depressibly displaceable by a user, said braking control subsystem being communicated with each of said right and left side brake-actuating subsystems such that each of said right and left side brake mechanisms is actuated proportionally to a magnitude of displacement of said brake pedal by said user such that upon actuation, the right and left side track assemblies are one of slowed and stopped according to the displacement magnitude of the brake pedal, thereby slowing or stopping the tracked vehicle according to the magnitude of displacement of said brake pedal;

said steering control subsystem including a steering wheel rotatably displaceable by a user in clockwise and counter-clockwise directions, said steering control subsystem being communicated with each of said right and left side brake-actuating subsystems such that a corresponding one of said right and left side brake mechanisms is actuated proportionally to a magnitude of displacement of said steering wheel by said user such that upon actuation, one of the track assemblies according to the direction of displacement of said steering wheel, is one of slowed and stopped, thereby turning the tracked vehicle in a direction determined by the direction of displacement of said steering wheel within a radius determined by the magnitude of displacement of said steering wheel, a fluid reservoir for storing a volume of fluid;

a hydraulic pump connected to said reservoir for removing fluid therefrom; and an accumulator control valve, which is connected to and supplied pressurized fluid from said hydraulic pump, said accumulator control valve being constructed and arranged to deliver fluid under pressure to one of said braking control subsystem and said right and left side brake-actuating subsystems, wherein said braking control subsystem includes a fluid accumulator, said fluid accumulator being constructed and arranged to store a volume of fluid under pressure therein, wherein each of said right and left side brake-actuating subsystems includes a pressure control valve, each pressure control valve being communicated with said accumulator control valve and having fluid under pressure supplied therefrom, each of said pressure control valves having a voltage actuator, which is constructed and arranged to actuate associated pressure control valves in proportion to a voltage of electrical power supplied thereto.

13. A system according to claim 12, wherein said steering control subsystem includes a voltage varying structure, said voltage varying structure being coupled to said steering wheel and being constructed and arranged to deliver to each of said voltage actuators electrical power having a voltage corresponding to the rotational displacement of said steering wheel.

14. A system according to claim 13, wherein said braking control subsystem is connected to each of said right and left side brake-actuating subsystems between said pressure control valves and said brake mechanisms.

15. A system according to claim 14, wherein said steering control subsystem is supplied power from a generator, which is operatively coupled to an engine of said tracked vehicle.

* * * * *